United States Patent [19]
Subramanian

[11] Patent Number: 6,026,240
[45] Date of Patent: Feb. 15, 2000

[54] METHOD AND APPARATUS FOR OPTIMIZING PROGRAM LOOPS CONTAINING OMEGA-INVARIANT STATEMENTS

[75] Inventor: Krishna Subramanian, Mountain View, Calif.

[73] Assignee: Sun Microsystems, Inc., Palo Alto, Calif.

[21] Appl. No.: 08/609,035

[22] Filed: Feb. 29, 1996

[51] Int. Cl.[7] .................................................. G06F 9/45
[52] U.S. Cl. .................................. 395/709; 395/705
[58] Field of Search .............................. 395/702, 705, 395/709

[56] References Cited

U.S. PATENT DOCUMENTS

| | | | |
|---|---|---|---|
| 5,202,995 | 4/1993 | O'Brien | 395/709 |
| 5,361,354 | 11/1994 | Greyzck | 395/705 |
| 5,457,799 | 10/1995 | Srivastava | 395/705 |
| 5,596,732 | 1/1997 | Hosoi | 395/705 |

OTHER PUBLICATIONS

Zima, Hans, and Barbara Chapman, Supercompilers for Parallel and Vector Computers, New York, NY, ACM Press pp. 112–172, 1991.

Aho, Alfred V., et al., Compilers: Principles, Techniques and Tools. Reading, MA: Addison Wesley (1986), pp. 638–642.

Primary Examiner—Alvin E. Oberley
Assistant Examiner—Peter Stecher
Attorney, Agent, or Firm—Beyer & Weaver, LLP

[57] ABSTRACT

Apparatus, methods, and computer program products are disclosed for optimizing programs containing single basic block natural loops with a determinable number of iterations. The invention optimizes, for execution speed, such program loops containing statements that are initially variant, but stabilize and become invariant after some number of iterations of the loop. The invention optimizes the loop by unwinding iterations from the loop for which the statements are variant, and by hoisting the stabilized statement from subsequent iterations of the loop.

10 Claims, 9 Drawing Sheets

```
For ( i=0; i<=N; i++) {
    z = x - 2;      //node 1
    x = a + b;      //node 2        401
    y = x - 1;      //node 3
}
```

METHOD AND APPARATUS FOR OPTIMIZING PROGRAM LOOPS CONTAINING OMEGA-INVARIANT STATEMENTS

FIELD OF THE INVENTION

This invention relates to the field of Optimizing Compilers for computer systems. Specifically, this invention is a new and useful optimization method and apparatus for optimizing the order of computer operation codes resulting from the compilation of a program loop.

BACKGROUND

Early computers were programmed by rewiring them. Modern computers are programmed by arranging a sequence of bits in the computer's memory. These bits perform a similar (but much more useful) function as the wiring in early computers. Thus, a modern computer operates according to the binary instructions resident in the computer's memory. These binary instructions are termed operation codes (opcodes). The computer fetches an opcode from the memory location pointed to by a program counter. The computer's central processor unit (CPU) evaluates the opcode and performs the particular operation associated with that opcode. Directly loading binary values in memory to program a computer is both time consuming and mind numbing. Programming languages simplify this problem by enabling a programmer to use a symbolic textual representation (the source code) of the operations that the computer is to perform. This symbolic representation is converted into binary opcodes by compilers or assemblers. By processing the source code, compilers and assemblers create an object file containing the opcodes corresponding to the source code. This object file, when linked to others, results in executable instructions that can be loaded into a computer's memory and executed by the computer.

A source program consists of an ordered grouping of strings (statements) that are converted into a binary representation (including both opcodes and data) suitable for execution by a target computer architecture. A source program provides a symbolic description of the operations that a computer will perform when executing the binary instructions resulting from compilation and linking of the source. The conversion from source to binary is performed according to the grammatical and syntactical rules of the programming language used to write the source. This conversion from source to binary is performed by both compilers and assemblers.

One significant difference between assemblers and compilers is that assemblers translate source code statements into binary opcodes in a one-to-one fashion (although some "macro" capabilities are often provided). On the other hand, compilers transform source code statements into sequences of binary opcodes that, when executed in a computer, perform the operation described by the source. The symbolic statements processed by a compiler are more general than those processed by an assembler and each compiled statement can produce a multitude of opcodes that, when executed by a computer, implement the operation described by the symbolic statement. Unlike an assembler, that maintains the essential structural organization of the source code when producing binary opcode sequences, a compiler may significantly change the structural organization represented by the source when producing the compiled binary. However, no matter how much the compiler changes this organization, the compiler is restricted in that the compiled binary, when executed by a computer, must provide the same result as the programmer described using the source language—regardless of how this result is obtained.

Many modern compilers can optimize the binary opcodes resulting from the compilation process. Due to the design of programming languages, a compiler can determine structural information about the program being compiled. This information can be used by the compiler to generate different versions of the sequence of opcodes that perform the same operation. (For example, enabling debugging capability, or optimizing instructions dependant on what version of the target processor the source code is compiled for.) Some optimizations minimize the amount of memory required to hold the instructions, other optimizations reduce the time required to execute the instructions. The invention disclosed herein optimizes so as to maximize execution speed for a particular type of loop operation.

Some advantages of optimization are that the optimizing compiler frees the programmer from the time consuming task of manually tuning the source code. This increases programmer productivity. Optimizing compilers also encourage a programmer to write maintainable code because manual tuning often makes the source code less understandable to other programmers. Finally, an optimizing compiler improves portability of code because source code tuned to one computer architecture may be inefficient on another computer architecture.

Compilers generally have three segments: (1) a front-end that processes the syntax and semantics of the language and generates at least one version of an "intermediate" code representation of the source; (2) a back-end that converts the intermediate code representation into binary computer instructions (opcodes) for a particular computer architecture (i.e., SPARC, X86, IBM, etc.); and (3) various code optimization segments between the front- and back-ends of the compiler. These optimization segments operate on, and adjust, the intermediate code representation of the source. For loops, the intermediate code representation generally includes data structures that either represent, or can be used to create, data dependency graphs (DDGs). DDGs embody the information required for an optimizer to determine which statements are dependent on other statements. The nodes in the graph represent statements in the loop and arcs represent the data dependencies between nodes. Data dependency graphs are described in chapter 4 of *Superconpilers for Parallel and Vector Computers*, by Hans Zima, ACM press, ISBN 0-201-17560-6, 1991.

One example of a prior art optimization is for the compiler to process the source code as if the programmer had written the source in a more efficient manner. For example, common subexpression elimination replaces subexpressions that are used more than once with a temporary variable set to the subexpression's value. Thus:

a=i*2+3;
b=sqrt(i*2);

compiles as if written as:

temp=i*2;
a=temp +3;
b=sqrt(temp);

Another optimization is by code motion. This optimization hoists, from out of the enclosing loop, expressions that are loop-invariant for each iteration. Thus:

while (!feop(fp)) DoSomething (fp, x*5);

compiles as if written as:

temp=x*5;

while (!feof(fp)) DoSomething (fp, temp);

Yet another optimization (trading memory for speed) is to expand the expressions contained in the loop so that less time is spent performing loop overhead operations. For example:

a=0;

for (i=0; i<100; i++) a=a+i;

can be compiled as if written as:

```
a = 0
for (i = 0; i < 100; i + = 5) {
    a = a + i;
    a = a + i + 1;
    a = a + i + 2;
    a = a + i + 3;
    a = a + i + 4;
}
```

Finally, the compiler could just unwind iterations from the loop so that there would be no loop overheads. Thus, a=0;

for (i=1; i<6; i++) a=a+i;

can be compiled as if written as:

```
a = 0;
{
    a = a + 1;
    a = a + 2;
    a = a + 3;
    a = a + 4;
    a = a + 5;
}
```

In the above examples, the plus "+" is used to indicate any language operator. Further, there are other optimizations that could be performed on each example. The above examples indicates the operation of each separate optimization. In an optimizing compiler, many optimizations are applied to best optimize the resultant executable instructions.

Of course, the original source code is not modified by the compiler, rather the compiler sufficiently understands the program structure, as described by the source, to make these optimizations for the programmer without changing the programmer's intended result. These optimizations result in the production of binary instructions that execute faster in the target computer than the non-optimized instructions that perform the same operations.

It is well understood in the art how to hoist loop-invariant operations out of a loop operation. A general discussion of optimizing compilers and the related prior art techniques can be found in *Conipilers: Principles, Techniques and Tools* by Alfred V. Aho, Ravi Sethi and Jeffery D. Ullman, Addison-Wesley Publishing Co., 1988, ISBN 0-201-10088-6, hereinafter Aho. Optimization of loop-invariant computations is described in Aho at pages 638–642.

However, it is not known to the art how to hoist certain statements that are almost loop-invariant. In particular, some compiler source sequences are not initially loop invariant, but become invariant after a given number of iterations. For example:

```
x = 1;
for (i = 0; i < = 10; i++) {
    y = x * 5;     //inst 1
    x = 2;         //inst 2
}
```

Here, on the first iteration of the loop, y receives the value of (1*5=5), and x receives the value 2. During the second iteration, y receives the value (2*5=10), and x again receives value 2. On the third iteration and continuing until the end of the loop, y receives the same value (10). In this example, the second statement of the loop "x=2; " is not loop-invariant because the value of x that reaches "inst 1" in the first iteration is different than the value of x that reaches "instr 1" in subsequent iterations. Thus, the prior alt cannot hoist the operations representing this statement from the loop's kernel. The same applies to variable y. However, x does not change subsequent to the first iteration over the loop. Thus, x and y become invariant after the first iteration. Keeping the operations represented by these statements within the loop's kernel, after the first iteration, slows execution of the loop because each execution of an instruction takes time and computer resources. After the initial variant iterations of the loop, these statements have no further utility. Thus the time spent processing these statements is wasted and the loop is correspondingly inefficient.

Statements that have assignments that are variant in the first omega iterations, but that become invariant after omega iterations are termed "omega-invariant". Omega-invariant statements "stabilize" after "omega" iterations. Hence, the value delivered by the statement stabilizes after omega iterations and becomes invariant for subsequent iterations. In the example above, the omega for "inst 1" is one because the value of y remains the same (10) after one iteration of the loop. The omega for "instr 2" is zero because it is assigned the value of 2 in the first and all subsequent iterations of the loop.

The prior art does not optimize this sequence of statements. Thus, prior art compilers generate less efficient (slower) loops than compilers practicing the invention. The invention described herein optimizes the execution speed of SBBN loops containing omega-invariant statements with a determinable number of iterations.

SUMMARY OF THE INVENTION

The present invention overcomes the disadvantages of the above described systems and has the specific utility, among others, of providing an economical, high performance, adaptable system, apparatus, method, system and computer program product for increasing the execution speed of target programs by reducing the number of instructions repeatedly executed during some programmed loops. One aspect of the present invention identifies program loop statements that contain omega-invariant statements and optimizes the execution speed of these loops.

In another aspect of the invention, a computer system is disclosed that has a central processing unit (CPU) and random access memory (RAM) coupled to the CPU, for use in compiling a target program to run on a target computer architecture. In addition, this system has an optimizing compiler capable of identifying single-basic-block-natural loops with a determinable tripcount and containing an omega-invariant operation. Further, this compiler is capable of detecting the contained omega-invariant statement and of determining the number of iterations required to stabilize the omega-invariant statement. Finally, the compiler is capable of optimizing the loop for increased execution speed dependent upon the number of iterations required to stabilize the omega-invariant statement.

In one aspect of the invention, an apparatus is disclosed using a computer and compiler system to optimize single-basic-block loops containing omega-invariant statements that stabilize after a determinable number of iterations.

In another aspect of the invention a code optimizer for use in a compiler operating on a computer system is disclosed for detecting and optimizing single-basic-block loops containing omega-invariant statements.

In yet another aspect of the invention, a method is disclosed for identifying and optimizing single-basic-block loops containing omega-invariant statements.

Finally, another aspect of the invention discloses a computer program product to cause a computer to detect and optimize single-basic-block loops containing omega-invariant statements.

DESCRIPTION OF THE DRAWINGS

The objects, features and advantages of the system of the present invention will be apparent from the following description in which.

NOTATIONS AND NOMENCLATURE

The detailed descriptions that follow are presented largely in terms of procedures and symbolic representation of operations on data bits within a computer memory. These procedural descriptions and representations are the means used by those skilled in the data processing arts to most effectively convey the substance of their work to others skilled in the art.

Figure 4:
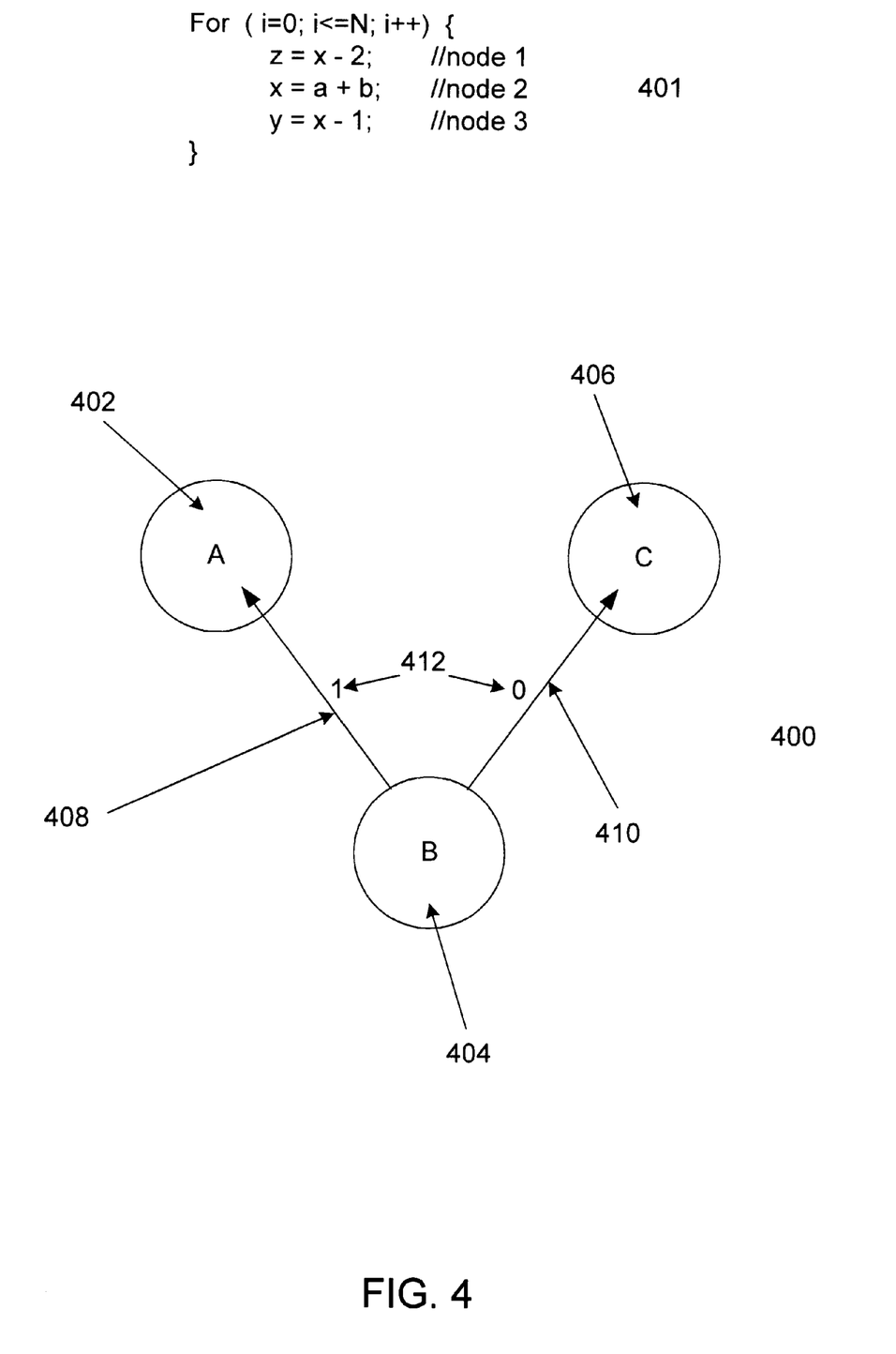
FIG. 4 illustrates a Data Dependency Graph constructed from a sample SBBN loop.

A Data Dependency Graph (DDG) is a data structure in the computer memory that represents how statements within a loop depend on other statements. These graphs include nodes that represent computer operations and arcs that represent dependencies between the nodes. These dependencies include flow dependencies, data dependencies and anti-dependencies. Data structures within the compiler that represent data dependency graphs are used to determine loop-invariant and omega-invariant statements within a loop. These data structures are often represented by diagrams using circles for nodes corresponding to statements and arcs between the nodes representing dependencies. FIG. 4 illustrates an example DDG and is described below.

Instructions are the compiled binary operation codes (opcodes) for a target computer architecture that implement the operation described by a statement. Often one compiled statement will describe multiple operations and generate many computer instructions.

A loop operation, when compiled and the resulting computer instructions executed on a computer, causes the computer to repeatedly execute the instructions enclosed within the loop. Each repetition of the enclosed instructions is a single iteration of the loop.

An iterative construct is a series of operations that effectuate a loop operation defined by a loop statement and the statements it encloses.

A loop is a programming language construct that describes an iterative process where statements within the body of the loop define operations that are repeatedly executed by a computer. In other words a compiled loop, when executed in a computer, causes the computer to repetitively iterate through the operations described by statements contained in the loop until some completion condition is satisfied. As such, loop statements represent an iterative construct that provides an iterative control process coupled to other statements contained within the body of the loop. Loops, as optimized by the invention, are limited to single-basic-block-natural-loops (SBBN loops) that have a determinable number of iterations (i.e., having a compile-time computable or known symbolic tripcount). That is, loops that do not contain any control flow structures, functions, procedures, or other constructs that change the flow of execution within the loop. Such loops have only one entry point, one exit point, and no branches within the loop.

The compiled instructions that implement loops are organized into a prologue that initializes the loop and a kernel that contains the opcodes representing the compiled statements within the loop's body and the test for the completion condition on the loop. The flow of execution is such that the prologue instructions are executed before the kernel instructions. Thus loop-invariant operations within the loop's kernel can be moved (hoisted) to the loop's prologue with the same functional result as if they were left within the loop. Hoisting is accomplished by using standard code motion algorithms such as the one described in Section 10.7 of Aho.

A loop is unwound when the operations within the loop's kernel, for some number of initial iterations, are hoisted to the prologue. Thus, some loop iterations are peeled off the loop's kernel. The number of iterations peeled off of the loop is termed the peelfactor. For each peel, the kernel operations are duplicated. For loops that have a variable number of iterations (e.g., that the iterations are determined at execution-time and not at compile-time), two versions of the instructions that effectuate the loop are created. One version effectuating a loop where the omega-invariant operation remains within the kernel and the other version including peeled iterations, an optimized omega-invariant operation and the optimized kernel. If the number of iterations specified for a particular invocation of the loop is less then the number of iterations peeled from the loop, the original loop is selected. Otherwise, the optimized version of the loop, consisting of the peels, the hoisted omega-invariant operation and the kernel, is executed.

The tripcount is the number of iterations required of the loop at the time the loop is entered. If the tripcount is greater than the peelfactor, the modified iterative process (the peels, the hoisted omega-invariant operation and the optimized kernel) will be selected, otherwise the original unpeeled loop will execute. For loops that have a tripcount that can be determined at compile time, the compiler determines if and how much to peel the loop.

A loop-invariant statement is a statement within a loop that does not depend on any other variant statement in the loop and generates the same result in each iteration of the loop. Prior art techniques exist to hoist compiled instructions, corresponding to loop-invariant statements, to the loop's prologue.

An omega-invariant statement is a statement that is initially variant for some omega iterations of a loop, but that stabilizes and remains invariant after omega iterations of the loop.

An operation is described by a statement and is represented by the corresponding intermediate code. The back-end portion of a compiler converts the operations described by the intermediate code into sequences of executable instructions for a target computer architecture. These instructions, when executed on the target computer effectuate the operation.

A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

Statements are the textual strings that have the syntax and semantics of a programming language. An example statement is "while (TRUE) {} ;" an instruction implementing the operation described by this statement would be the binary opcode for the target computer that causes the computer to repeatedly execute the same instruction. In some assembler language, this operation could be represented by "A: BR A".

The manipulations performed by a computer in executing opcodes are often referred to in terms, such as adding or comparing, that are commonly associated with mental operations performed by a human operator. No such capability of a human operator is necessary in any of the operations described herein that form part of the present invention; the operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

Finally, the invention may be embodied in a computer readable medium encoded with an optimizing compiler application program.

DESCRIPTION OF THE PREFERRED EMBODIMENT

Operating Environment

The invention can be practiced with any programming language that utilizes loop constructs. Some of these programming languages include, but are not limited to, FORTRAN, PASCAL, C, C++, ADA and compiled BASIC. Example loop constructs in C and C++ are the "for", the "do-while", and the "while" statements. The optimization provided by the invention applies to single-basic-block-natural-loops having a determinable number of iterations. Thus, these loops have either a tripcount determined at compile-time or a tlipcount determined at execute-time from a known operation. These loops have only one entry point, one exit point, and no branching of the flow of execution within the loop.

Figure 1:
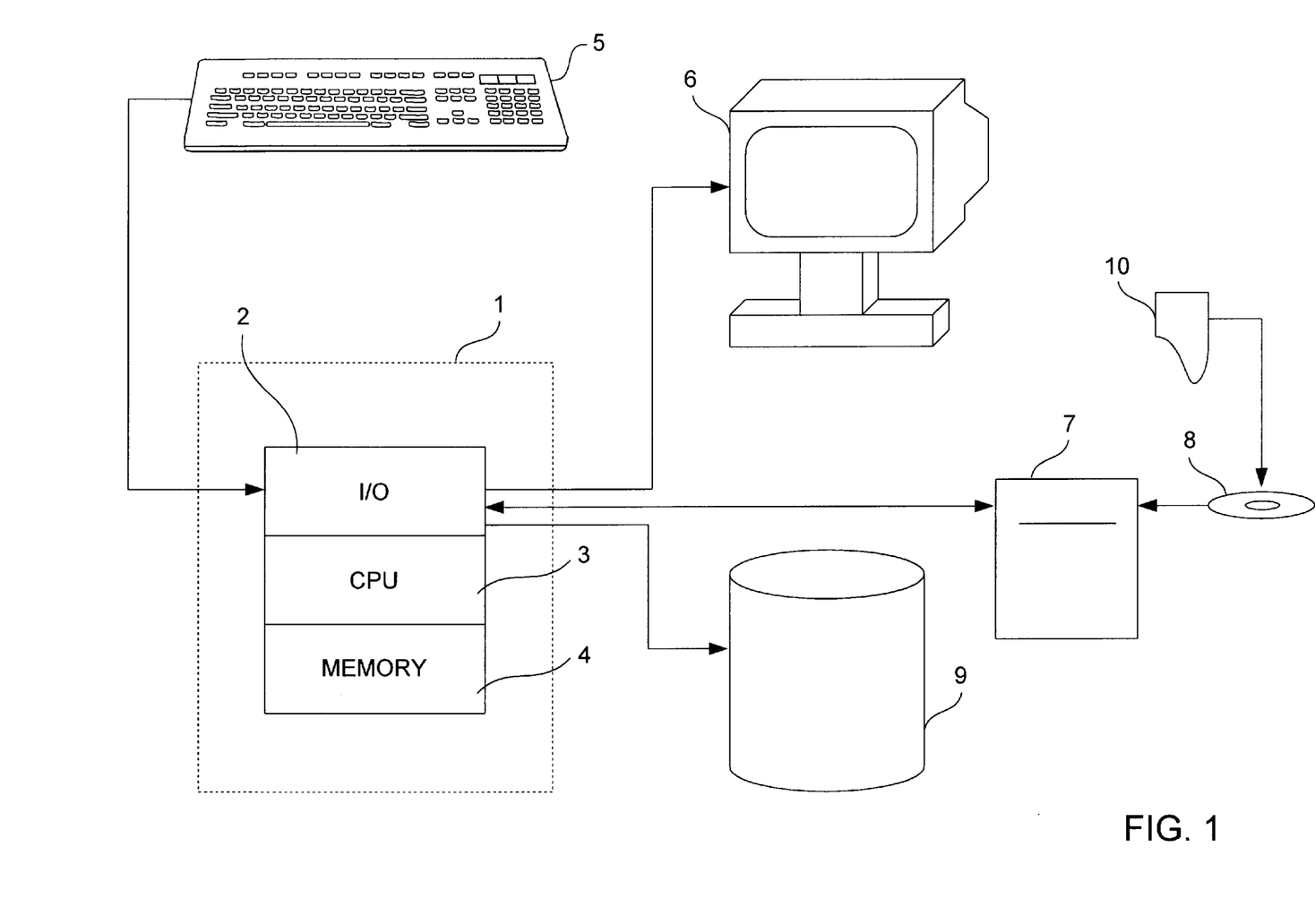
FIG. 1 illustrates a portion of a computer, including a CPU and conventional memory in which the invention may be embodied.

The invention is used with a computer system. Some of the elements of such a computer system are shown in FIG. 1, wherein a processor 1 is shown, having an Input/Output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 that typically contains programs 10 and data. Such a computer system is capable of executing a compiler program that embodies the invention.

Figure 2:
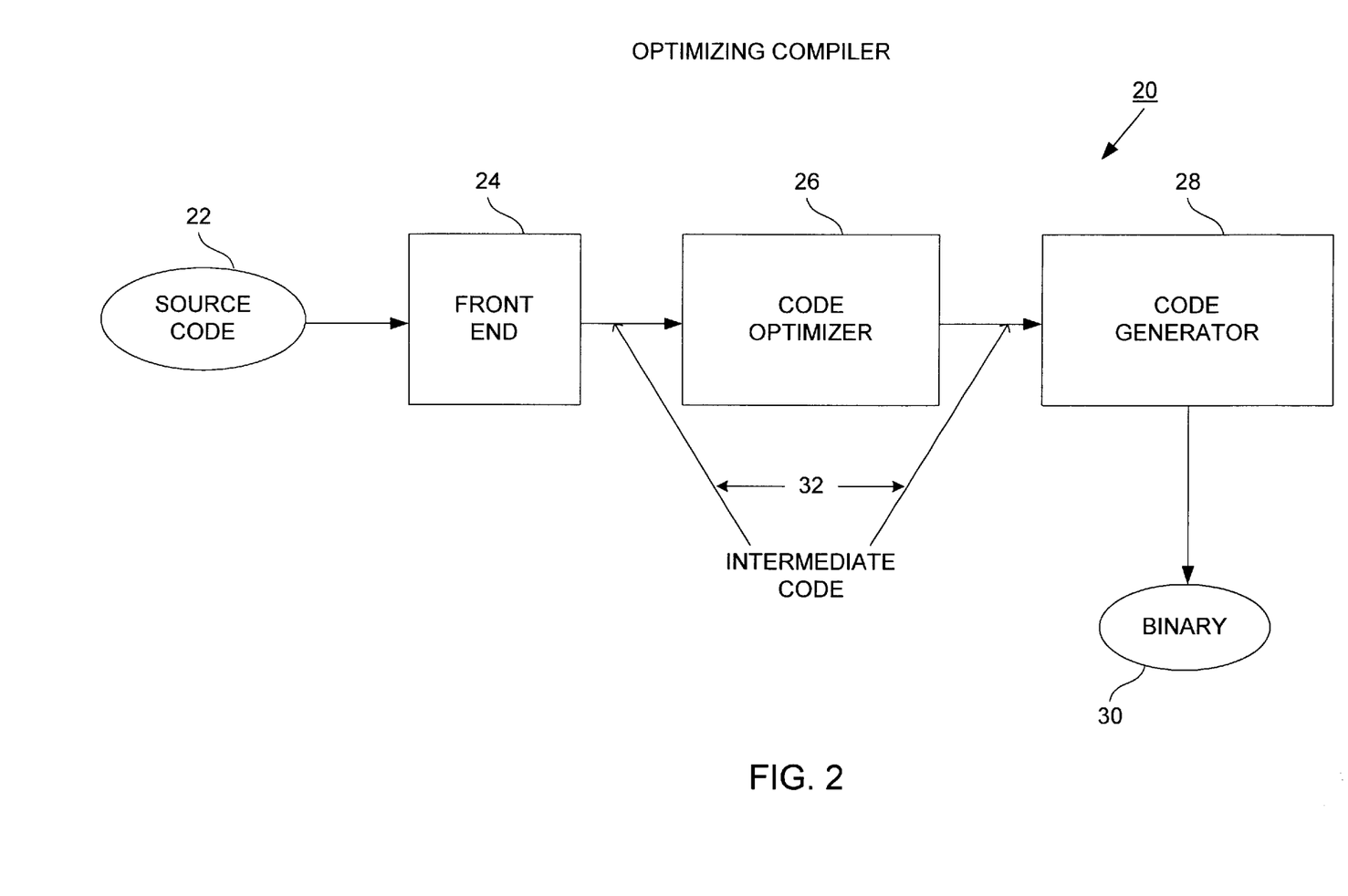
FIG. 2 illustrates a typical compiler showing the position of the code optimizer.

FIG. 2 illustrates a typical optimizing compiler 20, comprising a front-end compiler 24, a code optimizer 26 and a back-end code generator 28. The front-end 24 of a compiler takes, as input, a program written in a source language 22 containing a series of statements, including loop statements, and performs various lexical, syntactical and semantic analysis on these statements creating an intermediate code 32 representing the operation of the target program. This intermediate code 32 is used as input to the code optimizer 26 that attempts to adjust (improve) the intermediate code resulting in a faster-executing set of machine instructions 30. Some code optimizers 26 are trivial while others do a variety of computations in an attempt to produce the most efficient target program possible. Those of the latter type are called "optimizing compilers" and include such code transformations as common sub-expression elimination, dead-code elimination, hoisting loop-invariant statements from a loop's kernel, renaming temporary variables and interchanging two independent adjacent statements as well as performing register allocation. The intermediate code is either adjusted or recreated during the optimization process. Finally, the adjusted intermediate code is passed to the back-end code generator 28 where the operations described by this intermediate code are converted to binary opcodes corresponding to specific instructions for the target computer architecture.

Figure 3:
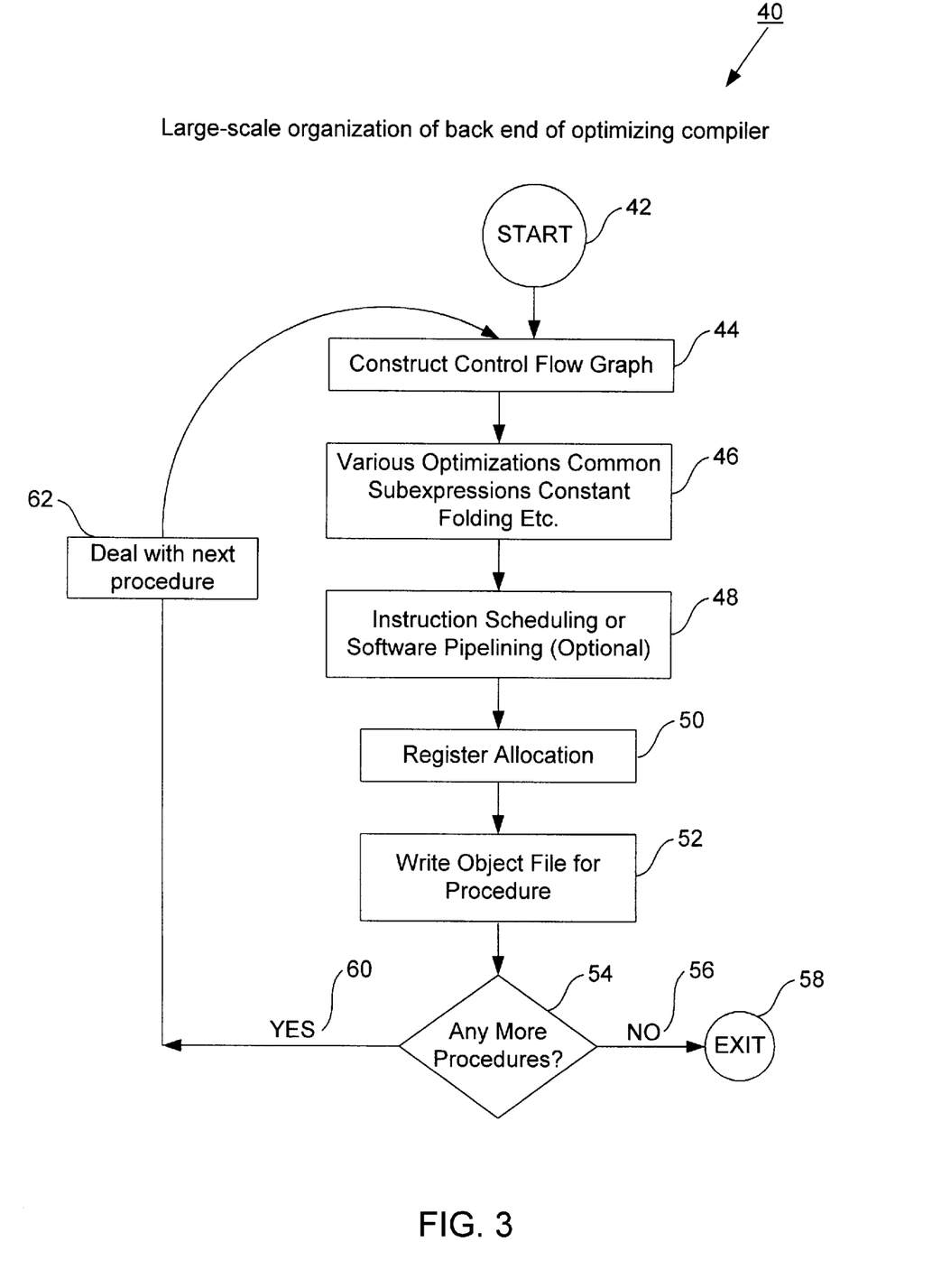
FIG. 3 illustrates a large scale organization of a code optimizer.

FIG. 3 depicts a typical organization of an optimizing compiler 40. On entry of the intermediate code 42, a data dependency graph is constructed 44. At this stage the code transformations mentioned above take place 46. Next, if supported by the compiler, instruction scheduling or "pipe-lining" may take place 48, followed by "Register allocation" 50. Finally, the adjusted intermediate code is sent 52 to the compiler back-end for conversion to the binary instructions of the target machine architecture.

The invention can be practiced in other segments of a compiler. For example, the invention can be practiced during the semantic and lexical scanning phase of the compiler when generating the initial intermediate code representing the operations of the program. This is true so long as the invention has access to sufficient information to construct a data dependency graph for a program loop; can determine either the tripcount, or a variable containing the tripcount, of the program loop; and can determine the operations enclosed within the program loop. In particular, in one embodiment, the invention resides in the instruction scheduling or software pipelining module 48. However, another embodiment could effectively have the invention reside within other various optimization portions 46 of the compiler. In fact, the invention could be practiced in compilers that do not use the "front-end, optimizer, back-end" structure.

The present invention increases the execution speed of target programs by reducing the number of instructions repeatedly executed during some programmed loops. It identifies program loop statements that contain omega-invariant statements and optimizes the execution speed of these loops. For example, the following SBBN loop (a "C" language "for" statement having a compile-time tripcount):

```
x = 1;
for (i = 0; i < =10; i++) {
    y = x * 5;
    a[i] = x;
    b[i] = y;
    x = 2;
}
``` would be optimized by the invention as if written as:

```
x = 1;
    y = x * 5;              //peel 1 (iteration 0)
    a[0] = x;
    b[0] = y;
    x = 2;
    y = x * 5;              //peel 2 (iteration 1)
    a[1] = x;
    b[1] = y;
    for (i = 2; i < = 10; i++) {    // iteration 2–9
        a[i] = x;
        b[i] = y;
    }
``` further, the following loop (containing an execute-time tripcount):

```
x = 1;
for (i = 0; i < = N; i++) {
    y = x * 5;
    a[i] = x;
    b[i] = y;
    x = 2;
}
``` would be optimized by the invention as if written as:

```
x = 1;
if (N > 2) {
    x = 1;
    y = x * 5;              //peel 1 (iteration 0)
    a[0] = x;
    b[0] = y;
    x = 2;
    y = x * 5;              //peel 2 (iteration 1)
    a[1] = x;
    b[1] = y;
    for (i = 2; i < = N; i++) {    // iteration 2-N
        a[i] = x;
        b[i] = y;
    } else {                // if N < =2
    for (i = 0; i < = N; i++) {
        y = x * 5;
        a[i] = x;
        b[i] = y;
        x = 2;
    }
}
```

Thus, in one aspect of the invention, single-basic-block-natural loops having a determinable number of iterations and containing omega-invariant operations are optimized during compilation, by unwinding omega iterations from the loop and then hoisting the stabilized omega-invariant operations from the kernel of the peeled loop. To determine which statements are omega-invariant, the compiler must first construct a data dependency graph.

FIG. 4 illustrates a data dependency graph (DDG) 400 for a loop described as shown by the source code at label 401. As is well known in the art, this source is representative of a SBBN loop asdescribed using the "C" language "for" statement. Such a loop statement represents an iterative construct when complied into computer instructions. DDGs interrelate how statements in a loop depend on other statements. Nodes 402, 404, 406 in the graph represent the three statements enclosed in the loop, arcs 408, 410 represent the data dependencies between the nodes. Here both node A 402 and node C 406 depend on node B 404. The numbers 412 next to the arcs 408, 410 indicate the data dependency distance between the nodes. Thus, arc 408 between node B 404 and node A 402 has a data dependency distance of 1 indicating that the assignment to x in one iteration is used by node A in the next iteration. Compare this with the arc 410 between node B 404 and node C 406 that has a dependency distance of zero. Arc 410 indicates that the assignment to x in node B 404 is used by node C 406 in the same iteration. Thus, a data dependency graph represents which operations depend on other operations. The data dependency distance is used when determining an omega for an operation.

Figure 5A:
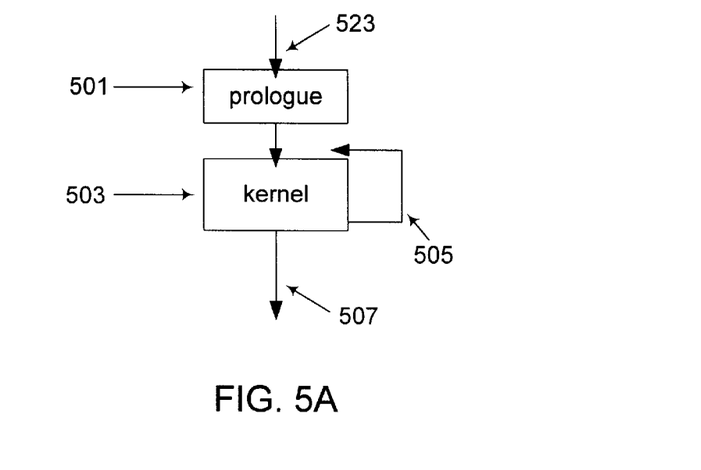
FIG. 5a illustrates the general characteristics and organization of computer instructions representing a non-optimized SBBN loop statement.
Figure 5B:
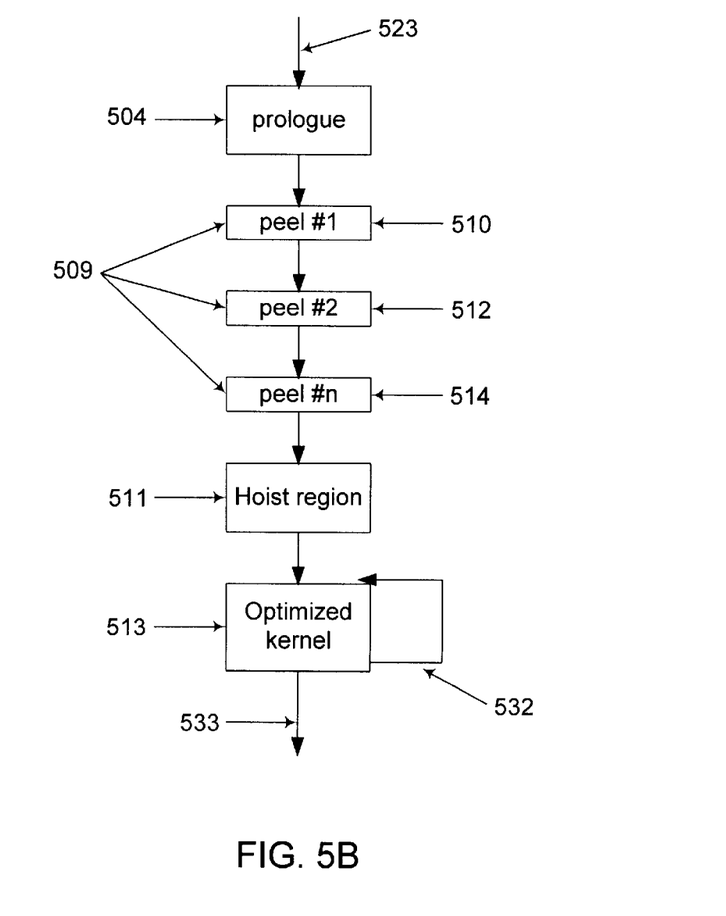
FIG. 5b illustrates the organization of computer instructions representing an SBBN loop optimized in accord with the invention having a compile-time determined tripcount.
Figure 5C:
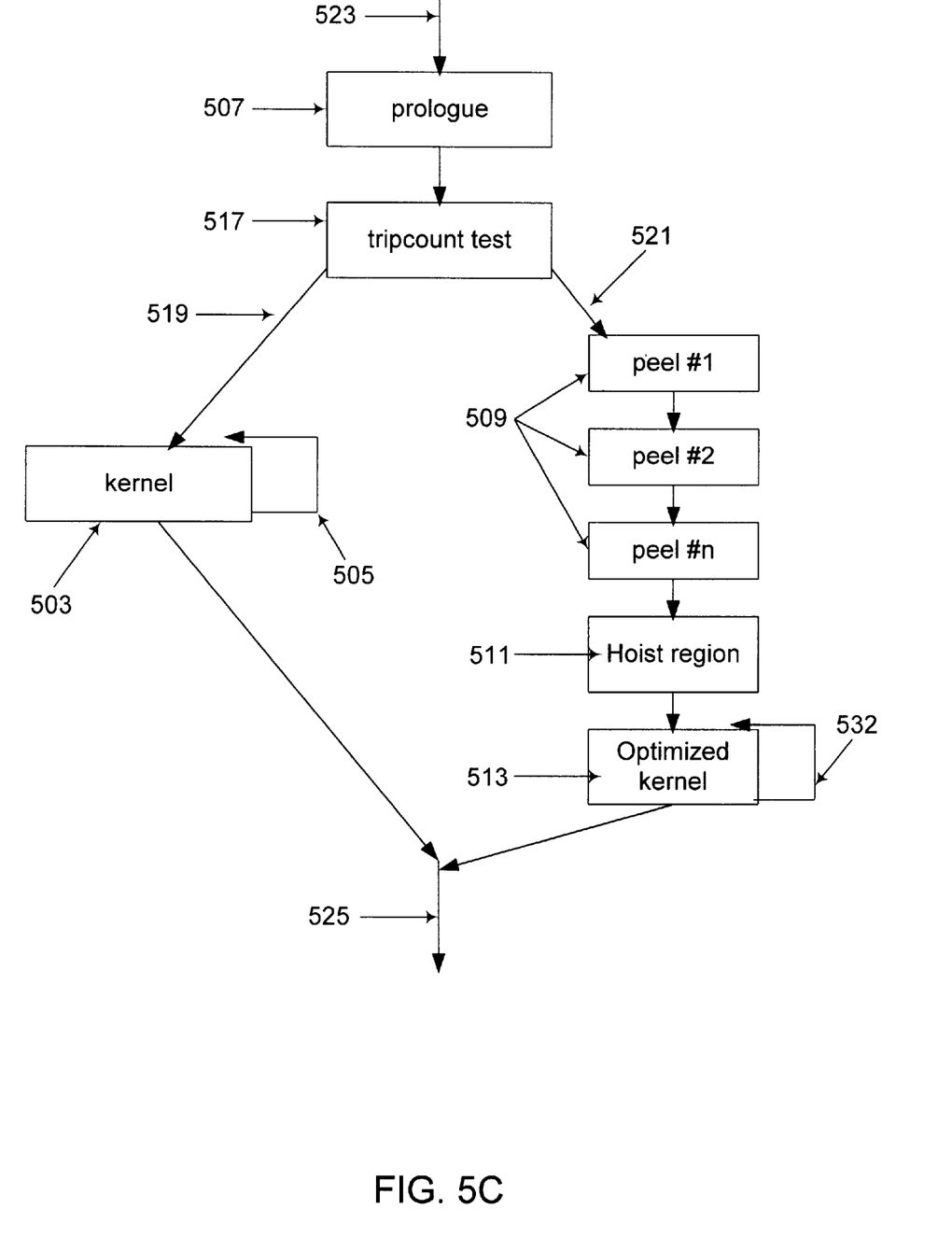
FIG. 5c illustrates the organization of computer instructions representing an SBBN loop optimized in accord with the invention having an execute-time determined tripcount.

FIGS. 5a, 5b, and 5c illustrate different ways a loop operation can be implemented. FIG. 5a illustrates the organization of the instructions that effectuate a loop that has not been optimized by the invention. FIG. 5b illustrates the organization for loops having a compile-time determined number of iterations and optimized by the invention. FIG. 5c illustrates the organization for loops having an execute-time determined number of iterations and optimized by the invention. These figures are further described below.

FIG. 5a illustrates the general organization of the iterative construct formed by the instructions that effectuate the loop operation described by a loop statement. When executing in a computer and as indicated by the arrow labeled 523, the loop operation starts when the flow of execution enters the prologue 501 of the iterative construct. The prologue 501 contains instructions that initialize loop control variables and effectuate loop-invariant operations. For a SBBN loop, the instructions in the prologue are executed on entry into the loop. The iterative construct includes a kernel 503 that contains instructions that are repeatedly executed in sequence every iteration of the loop until the loop termination condition occurs. If the termination condition has not occurred, the kernel 503 repeats for another iteration. Thus, the computer again executes the instructions in the kernel 503 as indicated by the arrow labeled 505. When the loop operation terminates, the flow of execution continues as indicated by the arrow labeled 507.

FIG. 5b illustrates the general organization of the instructions, as optimized by the invention, that effectuate the loop operation described by a SBBN loop statement having a compile-time determined number of iterations (the tripcount). The optimized SBBN loop retains the same basic characteristics as shown in FIG. 5a. The prologue 507 of the optimized loop contains the same operations as did the prologue 501 of the loop in FIG. 5a. However, the prologue 507 is expanded by the invention and now includes a number of peeled iterations 509 and a region that contains hoisted omega-invariant operations 511. Thus, the prologue 507 again contains instructions that initialize loop control variables and effectuate loop-invariant operations. After these instructions 507 execute, the flow of execution moves to the peels 509 (the iterations) unwound by the invention. Each of these peels 509 consist of the same operations as in the kernel 503 including any loop bookkeeping operations. In particular, peel #1 510 contains the instructions to effectuate the operations for the first iteration of the SBBN loop, peel #2 512 contains the instructions to effectuate operations for the second iteration and so forth through peel #n 514.

When executed, peels #1 through #n 509 effectuate the first omega iterations for the iterative construct's operation. That is, these peels include omega-invariant operations that have not stabilized. The number of peels corresponds to the peelfactor determined during the optimization process. After executing the peels 509, the flow of execution moves to the hoist region 511 where instructions that effectuate stabilized omega-invaliant operations are executed. The optimized kernel 513 no longer includes the omega-invariant operation as this operation has been hoisted to the hoist region 511. Because the optimized kernel 513 no longer includes the omega-invaliant instructions the optimized kernel 513 executes faster then the kernel 503 described in FIG. 5a. When the loop operation terminates, the flow of execution continues as indicated by the arrow labeled 533.

FIG. 5c illustrates the general organization of the instructions, as optimized by the invention, that effectuate the loop operation described by a SBBN loop statement having an execute-time determined number of iterations (the tripcount). Because the tripcount is determined at execution time, the iterative construct comprising the loop operation contains two versions of the loop operation—one version contains an optimized kernel 513 and the other contains a non-opfimized kernel 503. The compiler inserts additional operations 517 to select which version to use. These operations are dependent upon the tripcount required for any particular invocation of the loop operation. When this optimized loop operation executes, the flow of execution enters the prologue 507 as indicated by the arrow marked 523, having the same characteristics as the prologue 507 shown in FIG. 5b. After initializing required loop control variables and executing loop-invariant instructions, the flow of execution moves to the tripcount test 517. The instructions in the tripcount test 517 determine, by comparing the tripcount to the peelfactor, whether the optimized version of the SBBN loop operation is executed as indicated by the arrow marked 521. If this path 521 is taken, execution occurs through the peels 509, the hoist region 511, and the optimized kernel 513 in the same manner as was described for FIG. 5b. The flow of execution leaves the SBBN loop operation as indicated by the arrow labeled 525.

If the tripcount test 517, determines that non-optimized loop operation is to execute, the flow of execution follows the path indicated by the arrow marked 519 and the loop operation occurs in the same fashion as was described for the loop shown in FIG. 5a. Those skilled in the art will recognize that many techniques exist to place the instructions to select which loop operation to use and that these instructions can be placed either before or after the prologue.

Figure 6:
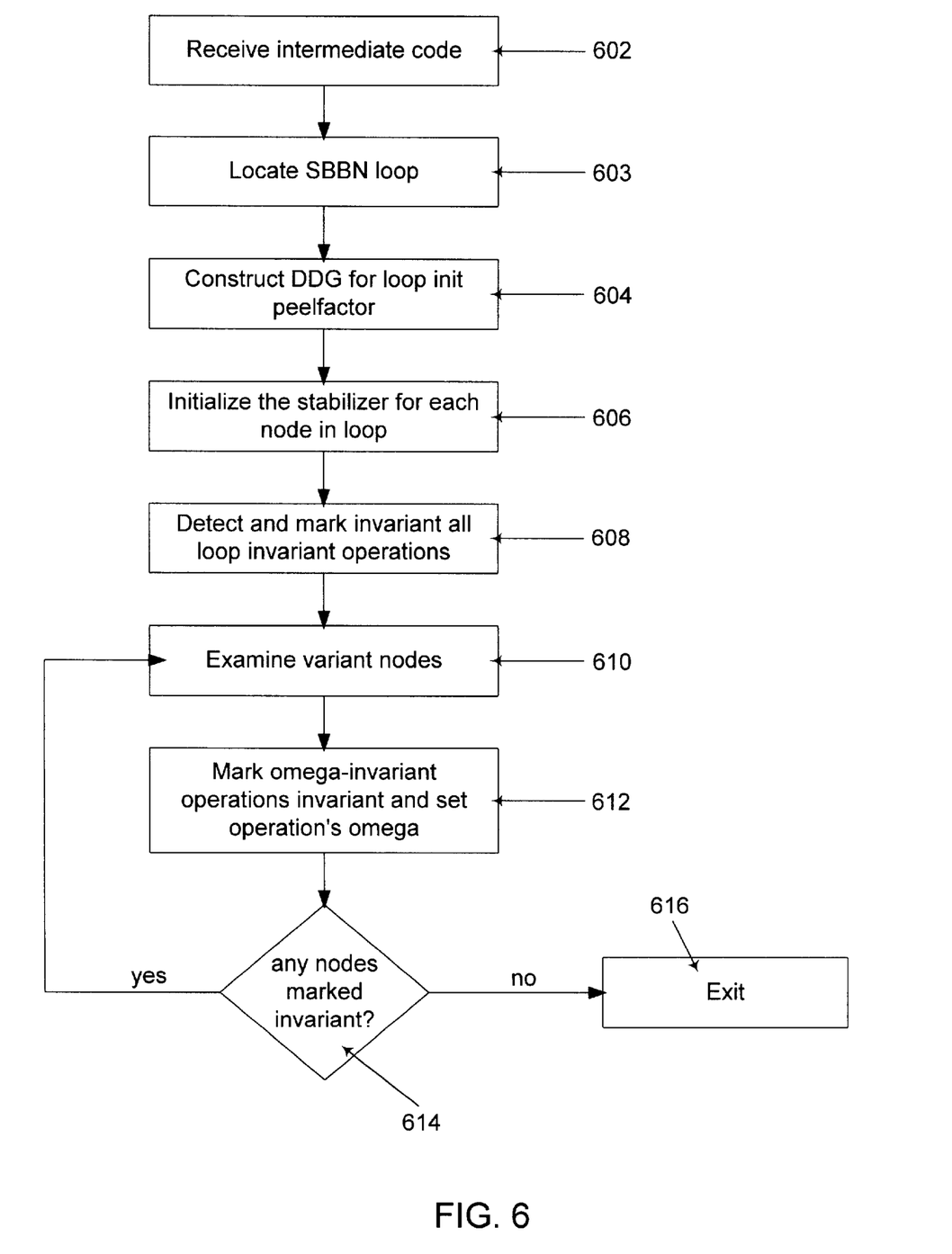
FIG. 6 Illustrates the compiler process for detecting an omega-invariant statement in a SBBN loop.
Figure 7:
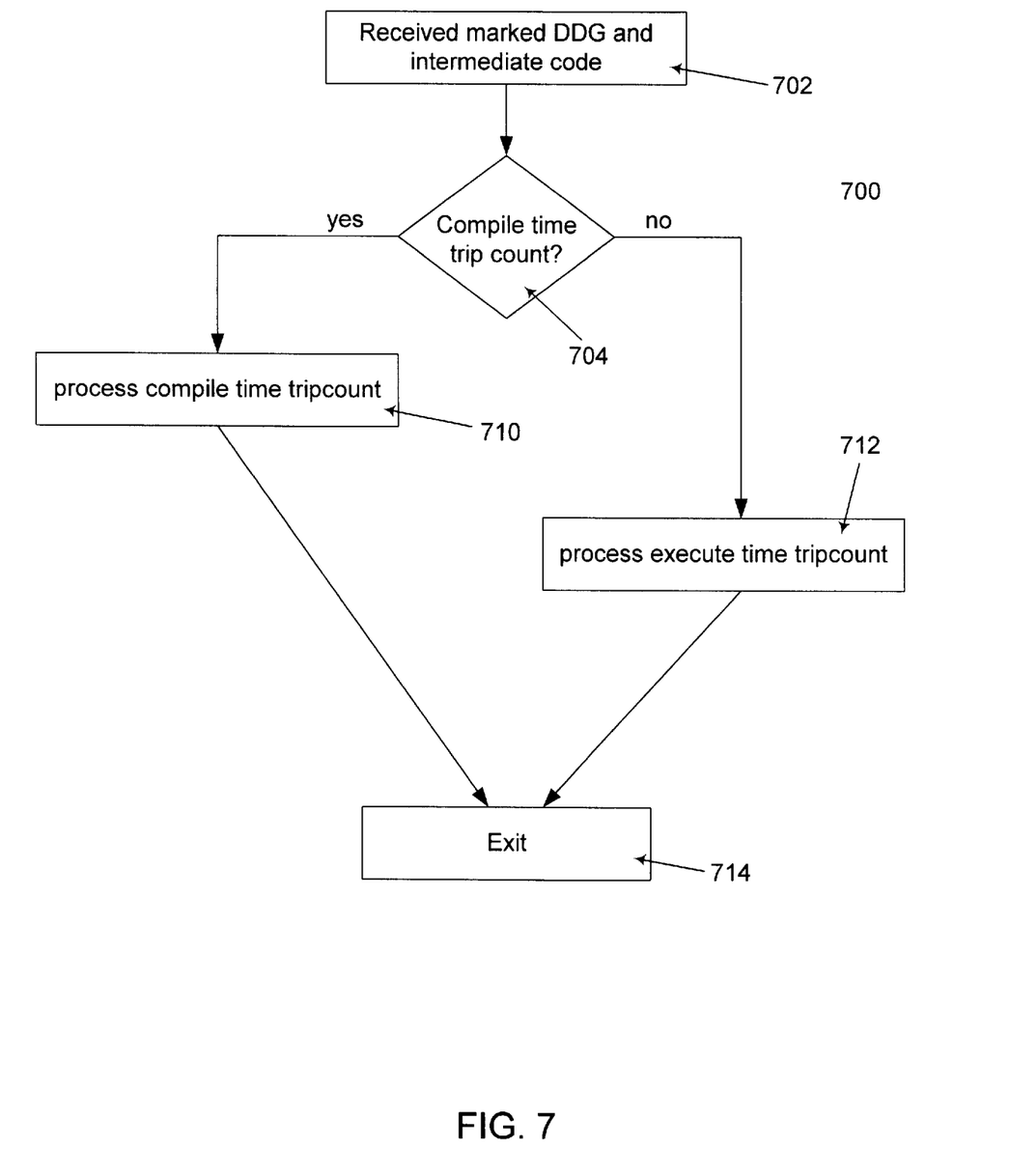
FIG. 7 Illustrates the general compiler process for optimizing execution of an omega- invariant statement within a SBBN loop using the invention.

FIGS. 6 and 7 illustrate how the invention is practiced in a compiler to generate the optimized loop operations having the structure shown in FIGS. 5b and 5c.

FIG. 6, illustrates the general process 600 of an optimizing compiler implementing an omega-invariant statement detection mechanism configured to detect omega-invariant operations in a SBBN loop. To perform this operation, the compiler detects omega-invariant operations within the loop operation. Once these operations are detected, an omega-invariant statement determination mechanism determines the omega for the statement. The flow of execution begins 602 when this segment of the optimizing compiler receives incoming intermediate code representing a SBBN loop. When the compiler detects a SBBN loop 603 it constructs a data dependency graph from the intermediate code that represents that loop 604 and initializes the peelfactor for the loop to zero. Each node on the graph is initialized as variant with a stabilizer of zero 606. Then, using the DDG, all loop-invariant operations are marked invariant 608 so that they will be hoisted out of the loop's kernel and into the iterative construct's prologue. This is accomplished using prior art techniques such as those described in Aho.

Next, each variant node is examined 610. If the examined node has only one arc, from a node in the loop marked invariant—the source node, the examined node is also marked invariant 612. The omega (the stabilizer value of the operation) for the examined node is set to the maximum of the existing omega for the examined node and the omega for the source node plus the dependency distance on the arc from the examined node to the source node. Finally, the peelfactor is set to the maximum of its current value and the omega for the current node.

Now at step 614, if any node was marked invariant during the just completed pass over the variant nodes, the process repeats by again examining each variant node 610. If no new nodes were marked invariant during the just completed pass, the detection process completes through 616.

Figure 7A:
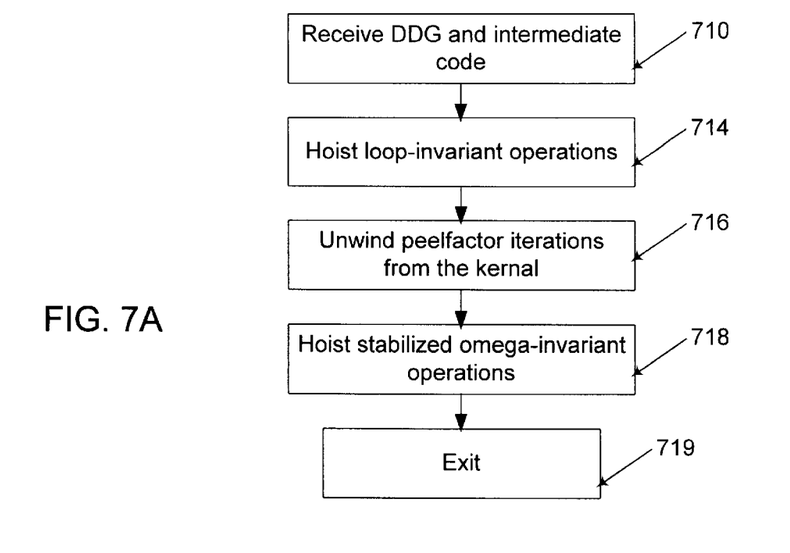
FIG. 7a Illustrates the compiler process for creating an optimized SBBN loop having a compile-time determined tripcount.
Figure 7B:
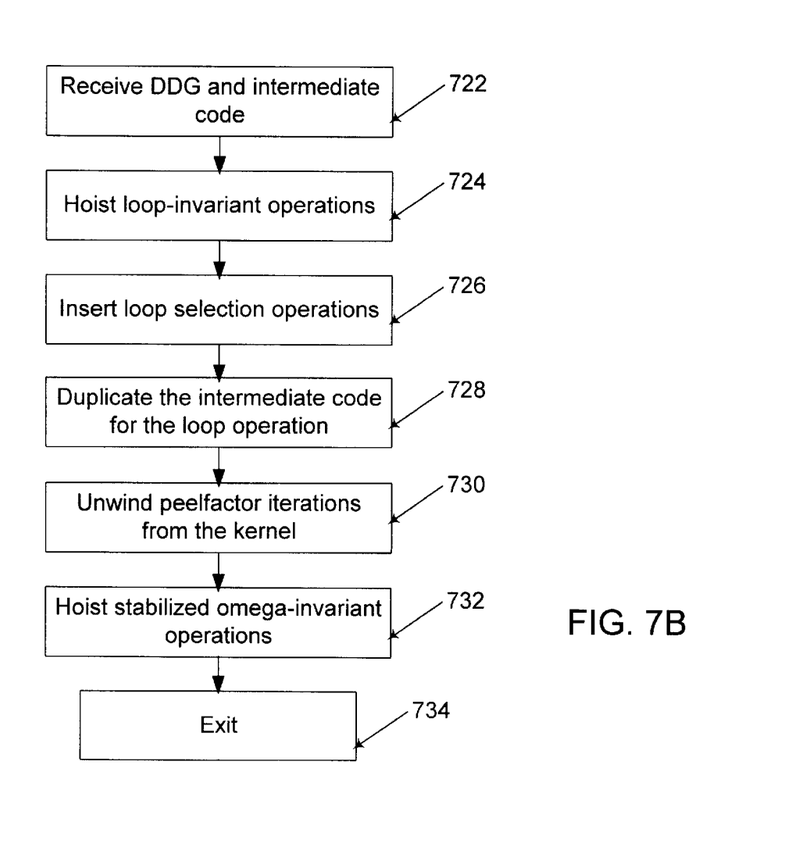
FIG. 7b illustrates the compiler process for creating an optimized SBBN loop with an execute-time determined tripcount.

FIGS. 7, 7a and 7b illustrate how the invention optimizes the omega-invariant operations detected as shown in FIG. 6.

FIG. 7 illustrates the general process 700 of an optimizing compiler implementing the invention for hoisting omega-invariant operations from the loop's kernel. This process, when performed by a computer, comprises a loop optimization mechanism. This mechanism adjusts the intermediate code representation of the loop operation, based on the omega values determined by the techniques described with FIG. 6, so as to optimize the loop operation. The compiler first determines whether the number of iterations for the loop is known at compile time. If so, then the optimizer creates an iterative construct of the form shown in FIG. 5b. If the number of iterations for the loop will only be known during execute-time, then the optimizer operates to create in iterative construct of the form shown in FIG. 5c. Hoisting of omega-invariant operations begins 702 upon receiving a DDG and the intermediate code that has been marked as explained in the description of FIG. 6. Next, the compiler determines whether the tripcount of the loop can be determined during compilation or is to be determined during execution 704. If the tripcount can be determined at compilation time the compiler processes 710 the loop as illustrated by FIG. 7a. If the tripcount can only be determined at execution time, the compiler processes 712 the loop as illustrated by FIG. 7b. In either case, the hoisting mechanism completes through the exit block 714 producing adjusted intermediate code that reflects the modifications made by the invention. The operations described by this adjusted intermediate code are eventually converted to binary opcodes specific to a target computer architecture with the structure as indicated in FIG. 5b or 5c.

FIG. 7a illustrates the mechanism used by the compiler that optimizes loop operations by adjusting the intermediate code, when the loop's tripcount can be determined at compile time. The hoisting process begins 710 upon receiving a DDG and the intermediate code. Then 714, loop invariant operations are hoisted to the prologue. Next 716, the compiler, using the loop peeling mechanism, unwinds peelfactor iterations (peelfactor is the maximum omega for all the statements within the loop) from the kernel, leaving omega peeled iterations and a kernel having a stabilized omega-invariant operation. Then 718, the compiler hoists the stabilized omega-invariant operations to the hoist region from the kernel, using prior art methods and techniques, leaving an optimized kernel. Finally, this process exits through the block labeled 719. One skilled in the art will recognize that it is within the scope of the invention to hoist operations that stabilize before peelfactor so as to optimize subsequent peeled iterations.

FIG. 7b illustrates how the compiler hoists operations when the loop's tripcount can not be determined at compile time. In this circumstance, the tripcount is determined during the flow of execution. When the iterative construct representing the loop operation is entered, the tripcount is evaluated, and either a non-optimized loop operation selected for further execution (if the tripcount is less than the number of peels) or, if the tripcount is large enough, an optimized loop operation is selected.

The compiler's hoisting process begins 722 upon receiving a DDG and the intermediate code. Then 724, loop invariant operations are hoisted to the prologue. Because the tripcount is determined at execution time, the iterative construct effectuates two versions of the loop operation -one version contains the prologue, peels, the hoisted omega-invariant operations and the optimized kernel (the optimized loop operation) and the other contains only the prologue and the non-optimized kernel. The compiler contains a loop selection insertion mechanism that inserts 726 additional operations to select which version of the loop operation to use. These selection operations are dependent upon the tripcount required by any given invocation of the loop operation. These selection operations are inserted in the prologue and comprise a comparison of the tripcount with the peelfactor. If, at execution, the tripcount is greater then the peelfactor, the peels, the hoisted omega-invariant operations and the kernel are executed. Otherwise, the loop operation containing the unpeeled kernel is executed. Those skilled in the art will recognize that the scope of the invention encompasses an embodiment that creates additional optimized loop operations using differing peelfactors along with the additional program logic to select between them.

Once the selection logic is inserted in the adjusted intermediate code representation, the SBBN loop operation, as defined by the intermediate code, is duplicated 728 by a loop duplication mechanism. One of the duplicates is then processed 730 by a loop peeling mechanism as explained in the description of FIG. 7a, above, to peel peelfactor iterations from the kernel, leaving omega peeled iterations of the loop's kernel and the kernel having a stabilized omega-invariant operation. Finally 732, the stabilized omega-invariant operations are hoisted, by a hoisting mechanism, to the hoist region from the kernel leaving an optimized kernel and the process exits 734. This process leaves an iterative construct in the form shown in FIG. 5c and explained above. Again, one skilled in the art will recognize that it is within the scope of the invention to hoist operations that stabilize before peelfactor so as to optimize subsequent peeled iterations.

One skilled in the art will understand that the invention as described above teaches a computer system for optimizing programmed loop statements, an apparatus for optimizing programmed loop statements, a code optimizer for use with a compiler, a computer controlled method, and a computer program product embodied in a computer readable program code mechanism.

Further, one skilled in the art will understand that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer system having a central processing unit (CPU) and a random access memory (RAM) coupled to said CPU, for use in compiling a target program for use with a target computer architecture, said computer system comprising:

(a) a compiler system resident in said computer system having an optimization mechanism comprising:
    (b) a loop-invariant statement optimization mechanism configured to optimize a loop statement containing a loop-invariant statement, said loop statement representing an iterative construct and said loop statement having the characteristics of a single basic block natural loop and including a determinable number of iterations;
    (c) an omega-invariant statement detection mechanism configured to detect a statement that is variant for at least the first iteration of said loop statement but which becomes invariant before the completion of the execution of all iterations of said loop statement within said loop statement;
    (d) said omega-invariant statement determination mechanism being further configured to determine an omega such that after omega iterations said omega-invariant statement becomes invariant, said omega-invariant statement determination mechanism including i. a loop detection mechanism configured to duplicate said iterative construct leaving said iterative construct and a duplicated iterative construct having a kernel;

ii. a loop peeling mechanism configured to unwind omega iterations from said kernel leaving one or more peeled iterative and said kernel having a stabilized omega-invariant operation;

iii. a hoisting mechanism configured to hoist said stabilized omega-invarialit operation out of said kernel; said peeled iterations and said hoisted omega-invariant operation and said kernel comprising an optimized iterative construct; and (e) an omega-invariant statement optimization mechanism configured to optimize said iterative construct responsive to said omega.

2. The computer system of claim 1 wherein said determinable number of iterations is determined at execute-time, said loop optimization mechanism further comprising:

a loop selection insertion mechanism configured to insert an execute-time loop selection mechanism, said loop selection mechanism configured to select either said optimized iterative construct or said duplicated iterative construct responsive to said execute-time determined number of iterations.

3. An apparatus for optimizing execution time for executable instructions in a target program that is designated to run on a target computer architecture, said apparatus comprising:

(a) a computer having a processor, a memory and an input/output section;

(b) a compiler system resident in said computer memory having an optimization mechanism comprising:

(c) a loop-invariant statement optimization mechanism configured to optimize a loop statement containing a loop-invariant statement, said loop statement representing an iterative construct and said loop statement having the characteristics of a single basic block natural loop and including a determinable number of iterations;

(d) an omega-invariant statement detection mechanism configured to detect a statement that is variant for at least the first iteration of said loop statement but which becomes invariant before the completion of the execution of all iterations of said loop statement, said omega-invariant statement determination mechanism including i. a loop detection mechanism configured to duplicate said iterative construct leaving said iterative construct and a duplicated iterative construct having a kernel;

ii. a loop peeling mechanism configured to unwind omega iterations from said kernel leaving one or more peeled iterative and said kernel having a stabilized omega-invariant operation;

iii. a hoisting mechanism configured to hoist said stabilized omega-invariant operation out of said kernel; said peeled iterations and said hoisted omega-invariant operation and said kernel comprising an optimized iterative construct; and (e) said omega-invariant statement determination mechanism being further configured to determine an omega such that after omega iterations said omega-invariant statement becomes invariant; and (f) an omega-invariant statement optimization mechanism configured to optimize said iterative construct responsive to said omega.

4. The apparatus of claim 3 wherein said determinable number of iterations is determined at execute-time, said omega-invariant statement optimization mechanism further comprising:

a loop selection insertion mechanism configured to insert an execute-time loop selection mechanism, said loop selection mechanism configured to select either said optimized iterative construct or said duplicated iterative construct responsive to said execute-time determined number of iterations.

5. A code optimizer for use in a compiler system for compiling a target program to run on a target computer architecture, said code optimizer comprising:

(a) a first portion configured to accept, as input, an intermediate code representation representing an iterative construct, said iterative construct having the characteristics of a single basic block natural loop including a determinable number of iterations;

(b) a second portion, coupled to said first portion, configured to optimize a loop statement containing a loop-invariant statement;

(c) a third portion, coupled to said first portion, configured to detect an omega-invariant operation within said iterative construct said omega-invariant operation being variant for at least the first iteration of said iterative construct but which becomes invariant before the completion of said iterative construct and to determine an omega such that after omega iterations said omega-invariant operation becomes invariant, said third portion including i. a loop detection mechanism configured to duplicate said iterative construct leaving said iterative construct and a duplicated iterative construct having a a kernel;

ii. a loop peeling mechanism configured to unwind omega iterations from said kernel leaving one or more peeled iterative and said kernel having a stabilized omega-invariant operation;

iii. a hoisting mechanism configured to hoist said stabilized omega-invariant operation out of said kernel; said peeled iterations and said hoisted omega-invariant operation and said kernel comprising an optimized iterative construct;

(d) a fourth portion, coupled to said third portion and configured to optimize said iterative construct responsive to said omega; said second and fourth portions generating an adjusted intermediate code representation; and (e) a fifth portion configured to output said adjusted intermediate code representation.

6. The code optimizer of claim 5 wherein said determinable number of iterations is determined at execute-time, and wherein said fourth portion further comprises:

a sixth portion to insert an execute-time loop selection mechanism to select either said optimized iterative construct or said duplicated iterative construct; said loop selection mechanism responsive to said determinable number of iterations, said sixth portion, said seventh portion, said eighth portion, and said ninth portion generating said adjusted intermediate code representation.

7. A computer controlled method of optimizing a loop statement within a target program directed at a target computer architecture, said loop statement describing an iterative construct, said loop statement having the characteristics of a single basic block natural loop including a detenninable number of iterations, said method comprising the steps of:

(a) detecting said loop statement containing one or more body statements;

(b) optimizing said loop statement with respect to a loop-invariant statement if such exists within said loop statement;

(c) detecting that one of said body statements is an omega-invariant statement that is variant for at least the first iteration of said loop statement but which becomes invariant before the completion of the execution of all iterations of said loop statement;

(d) determining an omega associated with said omega-invariant statement such that after omega iterations said omega-invariant statement becomes invariant, said step of determining including the sub-steps of:

(i) duplicating said iterative construct to provide a said iterative construct and a duplicated iterative construct having a kernel;

(ii) unwinding omega iterations from said kernel to provide one or more peeled iterative and said kernel having a stabilized omega-invariant operation;

(iii) hoisting said stabilized omega-invariant operation out of said kernel such that said peeled iterations and said hoisted omega-invariant operation and said kernel comprising an optimized iterative construct; and (e) optimizing said iterative construct responsive to said omega.

8. The method of claim 7 wherein said determinable number of iterations is determined at execute-time, and wherein step (e) further comprises:

inserting an execute-time loop selection mechanism configured to select either said optimized iterative construct or said duplicated iterative construct, said loop selection mechanism responsive to said execute-time determined number of iterations.

9. A computer program product comprising:

(a) a computer usable medium having a computer readable program code mechanism embodied therein to optimize a target program containing executable instructions directed toward a target computer architecture, said computer readable program code mechanisms in said computer program product comprising:

(b) computer readable code first optimization mechanisms to cause a computer to optimize a loop statement containing a loop-invariant statement, said loop statement representing an iterative construct and said loop statement having the characteristics of a single basic block natural loop and including a determinable number of iterations;

(c) computer readable code detection mechanisms to cause said computer to detect an omega-invariant statement that is variant for at least the first iteration of said loop statement but which becomes invariant before the completion of the execution of all iterations of said loop statement within said loop statement, said code detection mechanisms being configured to perform the operations of:

(i) duplicating said iterative construct to provide a said iterative construct and a duplicated iterative construct having a kernel;

(ii) unwinding omega iterations from said kernel to provide one or more peeled iterative and said kernel having a stabilized omega-invariant operation;

(iii) hoisting said stabilized omega-invariant operation out of said kernel such that said peeled iterations and said hoisted omega-invariant operation and said kernel comprising an optimized iterative construct;

(d) computer readable code determination mechanisms to cause said computer to determine an omega associated with said omega-invariant statement such that after omega iterations said omega-invariant statement becomes invariant;

(e) computer readable code omega-invariant statement optimization mechanisms to cause said computer to optimize said iterative construct responsive to said omega.

10. The computer program product of claim 9 wherein said determinable number of iterations is determined at execute-time in which said computer readable code omega-invariant statement optimization mechanisms comprise:

computer readable code insertion mechanisms to cause said computer to insert an execute-time loop selection mechanism, said loop selection mechanism configured to select either said optimized iterative construct or said duplicated iterative construct responsive to said execute-time determine number of iterations.

* * * * *

UNITED STATES PATENT AND TRADEMARK OFFICE
CERTIFICATE OF CORRECTION

PATENT NO. : 6,026,240
DATED : February 15, 2000
INVENTOR(S) : Krishna Subramanian

It is certified that error appears in the above-identified patent and that said Letters Patent are hereby corrected as shown below:

Column 16, line 33, change "having a a kernel" to --having a kernel--.

Column 16, line 66, change "detenninable" to --determinable--.

Signed and Sealed this

Fifteenth Day of May, 2001

Attest:

NICHOLAS P. GODICI

Attesting Officer

Acting Director of the United States Patent and Trademark Office